United States Patent
Satish

(10) Patent No.: US 9,846,772 B1
(45) Date of Patent: Dec. 19, 2017

(54) SYSTEMS AND METHODS FOR DETECTING MISPLACED APPLICATIONS USING FUNCTIONAL CATEGORIES

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 92 days.

(21) Appl. No.: 14/315,312

(22) Filed: Jun. 25, 2014

Related U.S. Application Data

(60) Provisional application No. 61/989,790, filed on May 7, 2014.

(51) Int. Cl.
| | | |
|---|---|---|
| *G06F 17/00* | (2006.01) | |
| *G06F 21/50* | (2013.01) | |
| *H04L 29/06* | (2006.01) | |

(52) U.S. Cl.
CPC ............ *G06F 21/50* (2013.01); *H04L 63/102* (2013.01); *H04L 63/20* (2013.01)

(58) Field of Classification Search
CPC .......... G06F 21/51; G06F 21/52; G06F 21/55; G06F 21/56; H04L 63/20; H04L 63/102
See application file for complete search history.

(56) References Cited

U.S. PATENT DOCUMENTS

| | | | |
|---|---|---|---|
| 5,956,729 A | 9/1999 | Goetz et al. | |
| 7,840,663 B1 | 11/2010 | Hinchliffe et al. | |
| 8,365,283 B1 | 1/2013 | Satish et al. | |
| 8,621,625 B1 | 12/2013 | Bogorad et al. | |
| 8,806,644 B1 * | 8/2014 | McCorkendale | ... H04L 63/1416 713/188 |
| 9,152,694 B1 * | 10/2015 | Padidar | ............ G06F 17/30598 |
| 9,571,509 B1 | 2/2017 | Satish et al. | |

(Continued)

OTHER PUBLICATIONS

Dark Reading, "Automated Malware Analysis Under Attack", http://www.darkreading.com/advanced-threats/automated-malware-analysis-under-attack/240145167, as accessed May 14, 2014, (Dec. 20, 2012).

(Continued)

*Primary Examiner* — Ali Abyaneh
*Assistant Examiner* — Shaqueal Wade
(74) *Attorney, Agent, or Firm* — FisherBroyles, LLP

(57) ABSTRACT

A computer-implemented method for detecting misplaced applications using functional categories may include (1) identifying a functional category assigned to an application located on a computing system, the functional category describing a field of functionality that the application performs, (2) identifying an additional functional category assigned to at least one of the computing system and another application located on the computing system, (3) applying a security policy to both the functional category assigned to the application and the additional functional category to determine whether the application belongs on the computing system according to the security policy, and (4) performing a security action to protect users based on the application of the security policy to the functional category assigned to the application and the additional functional category. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0079379 | A1 | 4/2007 | Sprosts et al. |
| 2007/0136292 | A1 | 6/2007 | Ohara |
| 2007/0256127 | A1 | 11/2007 | Kraemer et al. |
| 2008/0228814 | A1* | 9/2008 | Raley .................. G06Q 30/02 |
| 2009/0044024 | A1 | 2/2009 | Oberheide et al. |
| 2009/0075592 | A1* | 3/2009 | Nystrom ............ G06K 19/0719 455/41.1 |
| 2011/0219449 | A1 | 9/2011 | St. Neitzel et al. |
| 2012/0159260 | A1 | 6/2012 | Fortune et al. |
| 2012/0210428 | A1 | 8/2012 | Blackwell |
| 2012/0240236 | A1* | 9/2012 | Wyatt ................. G06F 21/564 726/25 |
| 2012/0266157 | A1* | 10/2012 | Mun ...................... G06F 8/61 717/174 |
| 2012/0317609 | A1* | 12/2012 | Carrara .............. G06F 21/6218 726/1 |
| 2013/0117848 | A1 | 5/2013 | Golshan et al. |
| 2015/0040246 | A1* | 2/2015 | Yuen .................. H04L 63/168 726/30 |
| 2015/0220734 | A1* | 8/2015 | Nalluri .................. G06F 21/51 726/23 |
| 2015/0261653 | A1 | 9/2015 | Lachambre et al. |

OTHER PUBLICATIONS

"Gartner Magic Quadrant for Endpoint Protection Platforms", http://www.mcafee.com/us/independent-reports/gartner-mq-endpoint-protection-platforms.aspx, as accessed May 14, 2014, McAfee, Inc., (May 6, 2013).

"Next Generation Detection—Dynamic Malware Analysis Service", http://www.proofpoint.com/products/targeted-attack-protection/next-generation-detection.php, as accessed May 14, 2014, Proofpoint, Inc., (On or before May 14, 2014).

Sourabh Satish, et al; Systems and Methods for Analyzing Malware Samples and Assigning File Reputations; U.S. Appl. No. 61/989,790, filed May 7, 2014.

Sourabh Satish; Systems and Methods for Identifying Malicious Files; U.S. Appl. No. 14/301,985, filed Jun. 11, 2014.

Andrew Collingwood Watson, et al; Systems and Methods for Analyzing Suspected Malware; U.S. Appl. No. 14/314,033 filed Jun. 25, 2014.

Sourabh Satish; Systems and Methods for Analyzing Malware Samples; U.S. Appl. No. 14/314,031, filed Jun. 25, 2014.

Sourabh Satish, et al; Systems and Methods for Identifying Variants of Samples Based on Similarity Analysis; U.S. Appl. No. 14/315,321, filed Jun. 25, 2014.

"Application software", http://en.wikipedia.org/wiki/Application_software, as accessed Apr. 24, 2014, Wikipedia, (May 8, 2004).

"Advanced Threat Report 2013", FireEye, Inc., https://www2.fireeye.com/ppc-advanced-threat-report-2013-uk.html, as accessed Apr. 24, 2014, (2013).

"Palo Alto Networks", https://www.paloaltonetworks.com/, as accessed Apr. 24, 2014, (Oct. 18, 2000).

"FireEye, Inc.", http://www.fireeye.com/, as accessed May 6, 2014 (Oct. 12, 1999).

Dark Reading, "Automated Malware Analysis Under Attack", http://www.darkreading.com/vulnerabilities---threats/automated-malware-analysis-under-attack/d/d-id/1138904?, as accessed May 14, 2014, (Dec. 20, 2012).

Zeltser, Lenny "5 Steps to Building a Malware Analysis Toolkit Using Free Tools", http://zeltser.com/malware-analysis-toolkit/, as accessed May 14, 2014, (1995).

Shinotsuka, Hiroshi "Malware Authors Using New Techniques to Evade Automated Threat Analysis Systems", http://www.symantec.com/connect/blogs/malware-authors-using-new-techniques-evade-automated-threat-analysis-systems,as accessed May 14, 2014, Security Response Blog, Symantec, (Oct. 26, 2012).

"Cuckoo Sandbox", http://www.cuckoosandbox.org/, as accessed May 14, 2014, (2010).

L33T, "Setup Automated Malware Analysis—Cuckoo Sandbox on Bt-3", http://www.securitytube.net/video/6653, as accessed May 14, 2014, (Jan. 14, 2013).

"Blue Coat", https://www.bluecoat.com/, as accessed May 14, 2014, (Mar. 24, 2002).

Sourabh Satish; Identifying Misuse of Legitimate Objects; U.S. Appl. No. 13/940,106, filed Jul. 11, 2013.

* cited by examiner

SYSTEMS AND METHODS FOR DETECTING MISPLACED APPLICATIONS USING FUNCTIONAL CATEGORIES

CROSS REFERENCE TO RELATED APPLICATION

This application claims priority to provisional U.S. Application No. 61/989,790, filed 7 May 2014, the disclosure of which is incorporated, in its entirety, by this reference.

BACKGROUND

Individuals and organizations constantly seek to protect their computing systems from malware and security threats. For example, attackers may drop applications onto a computing system to enable exploits of the system. In many cases, these applications constitute malware. Moreover, a security vendor may have previously identified the application (e.g., by hash) as malware.

In other situations, however, attackers may use multiple applications, tools, scripts, files, etc., together in coordinated attacks. In these attacks, not all of the applications may be known to constitute malware. In fact, some of the applications may be whitelisted or known to be safe, at least safe in certain contexts. Nevertheless, applications that are safe in one context may present a security threat in another context. For example, a database program may be safe on a database server that stores corporate records. The same database program may constitute a security threat on a tablet if the corporation only intends the tablet to function as a voice-over-IP phone. The database program may constitute a security threat on the tablet regardless of whether an attacker placed the program on the tablet by design or instead an administrator placed the program there by accident. Accordingly, the instant disclosure identifies and addresses a need for additional and improved systems and methods for detecting misplaced applications using functional categories.

SUMMARY

As will be described in greater detail below, the instant disclosure generally relates to systems and methods that protect users by, for example, identifying anomalous applications that perform functionality that does not fit with the functionality of other applications on the same computing system according to a security policy. In one example, a computer-implemented method for detecting misplaced applications using functional categories may include (1) identifying a functional category assigned to an application located on a computing system, the functional category describing a field of functionality that the application performs, (2) identifying an additional functional category assigned to at least one of the computing system and another application located on the computing system, (3) applying a security policy to both the functional category assigned to the application and the additional functional category to determine whether the application belongs on the computing system according to the security policy, and (4) performing a security action to protect users based on the application of the security policy to the functional category assigned to the application and the additional functional category.

In one embodiment, the same or different computing system may assign the functional category to the application at least in part by analyzing evidence that indicates functionality performed by the application. In another embodiment, the evidence may include (1) an ACTIVE DIRECTORY classification, (2) data accessed by the application, (3) data output by the application, and/or (4) metadata for the application.

In one embodiment, the same or different computing system may analyze previously categorized applications, using machine learning, to assign the functional category to the application by predicting that the application performs functionality that corresponds to the functional category. In some examples, identifying the functional category assigned to the application may include receiving manual input by a user indicating a tag assigned to the application.

In one embodiment, the security policy specifies (1) whether the functional category and the additional functional category are authorized as a pair and/or (2) whether a degree of relatedness between the functional category and the additional functional category satisfies a security threshold. In some examples, identifying the additional functional category may include iteratively identifying additional functional categories for respective applications located on the computing system. In further examples, identifying the additional functional category may include scanning the computing system for all applications located on the computing system.

In one embodiment, the same or different computing system may generate the security policy, through machine learning, by analyzing other applications that, for each of the respective applications, was previously detected as one of: (1) authorized in a context where the respective application was located and (2) not authorized in the context where the respective application was located. In one embodiment, each context may identify (1) functional categories of other applications where the respective application was located and/or (2) a functional category of a previous computing system where the respective application was located. In some examples, applying the security policy may include applying the security policy to the functional category of the application and at least two additional functional categories of at least two other applications.

In one embodiment, a system for implementing the above-described method may include (1) an identification module, stored in memory, that (A) identifies a functional category assigned to an application located on a computing system (the functional category describing a field of functionality that the application performs) and (B) identifies an additional functional category assigned to at least one of the computing system and another application located on the computing system, (2) an application module, stored in memory, that applies a security policy to both the functional category assigned to the application and the additional functional category to determine whether the application belongs on the computing system according to the security policy, (3) a performance module, stored in memory, that performs a security action to protect users based on the application of the security policy to the functional category assigned to the application and the additional functional category, and (4) at least one physical processor configured to execute the identification module, the application module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a functional category assigned to an application located on a computing system, the functional category describing a field of functionality that the application performs, (2) identify an additional functional category assigned to at least one of the computing system and another application located on the computing system, (3) apply a security policy to both the functional category assigned to the application and the additional functional category to determine whether the application belongs on the computing system according to the security policy, and (4) perform a security action to protect users based on the application of the security policy to the functional category assigned to the application and the additional functional category.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
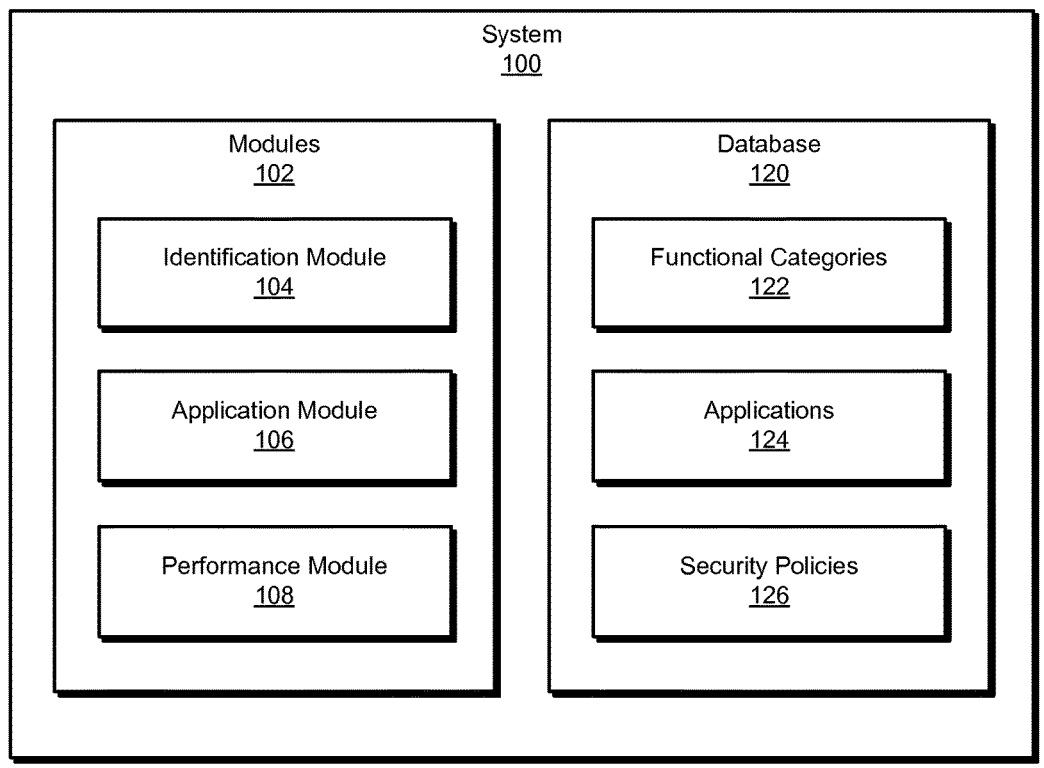
FIG. 1 is a block diagram of an exemplary system for detecting misplaced applications using functional categories.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting misplaced applications using functional categories. As will be explained in greater detail below, the disclosed systems and methods may protect users from misplaced applications, even when those applications are whitelisted or categorized as safe in a generic, global, and/or unknown context. For example, the disclosed systems and methods may protect users from applications that an administrator accidentally misplaces in a context where the application does not belong. The disclosed systems and methods may similarly protect users from applications that an attacker intentionally places in a context where the application does not belong for use in a coordinated attack.

Figure 2:
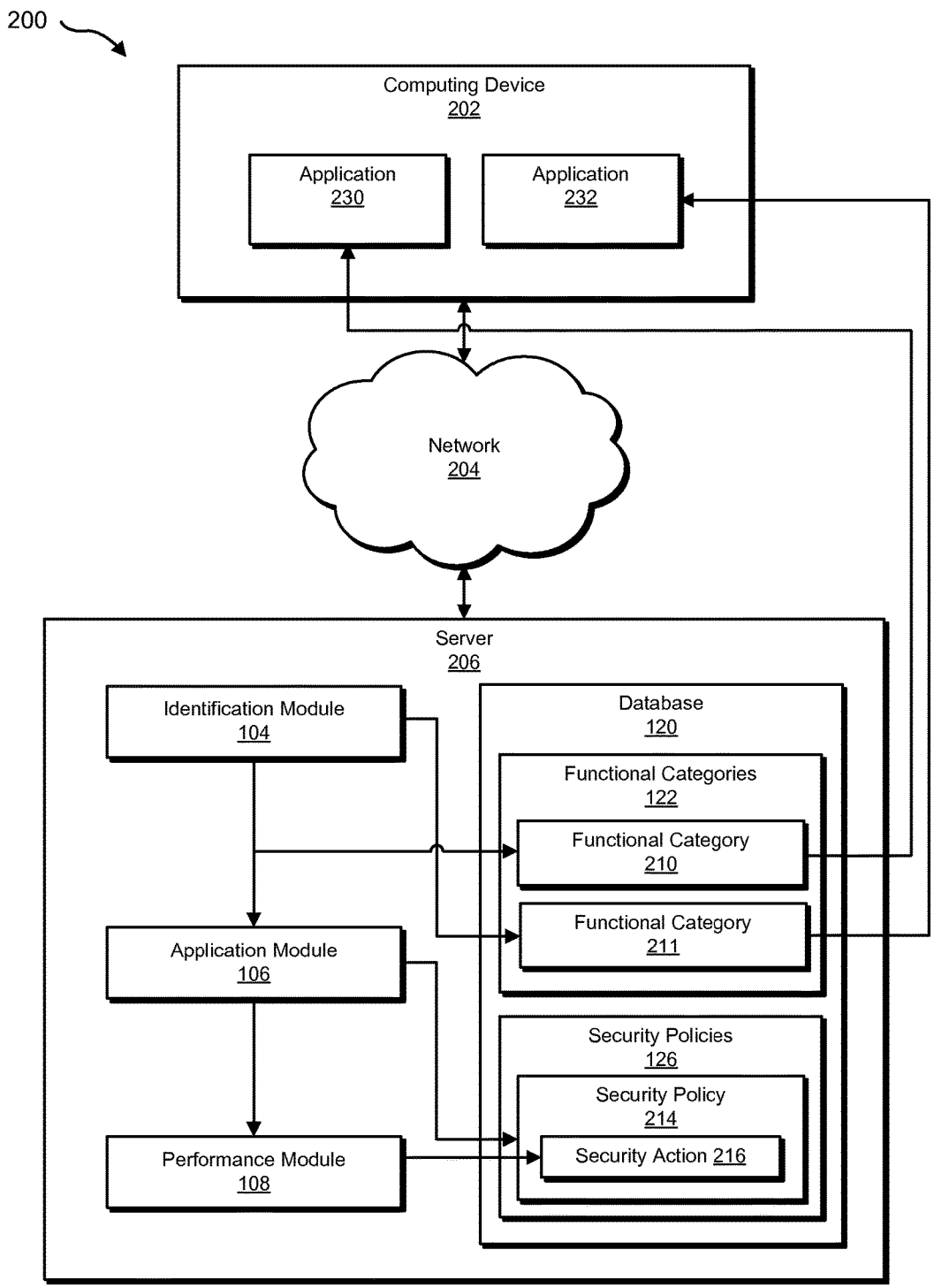
FIG. 2 is a block diagram of an additional exemplary system for detecting misplaced applications using functional categories.

The following will provide, with reference to FIGS. 1-2, detailed descriptions of exemplary systems for detecting misplaced applications using functional categories. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for detecting misplaced applications using functional categories. As illustrated in this figure, exemplary system 100 may include one or more modules 102 for performing one or more tasks. For example, and as will be explained in greater detail below, exemplary system 100 may also include an identification module 104 that may identify a functional category assigned to an application located on a computing system. The functional category may describe a field of functionality that the application performs. Identification module 104 may similarly identify an additional functional category assigned to the computing system and/or another application located on the computing system.

Exemplary system 100 may additionally include an application module 106 that may apply a security policy to both the functional category assigned to the application and the additional functional category to determine whether the application belongs on the computing system according to the security policy. Lastly, exemplary system 100 may also include a performance module 108 that may perform a security action to protect users based on the application of the security policy to the functional category assigned to the application and the additional functional category. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store functional categories 122, which may indicate the fields of functionality performed by respective applications 124. Database 120 may similarly be configured to store security policies 126, which may define rules and/or relationships between different ones of functional categories 122. Security policies 126 may similarly define security actions to take in response to detecting that applications are misplaced (or correctly placed) on a computing system, as discussed below.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to detect misplaced applications using functional categories. For example, Identification module 104 may identify a functional category 210 assigned to an application 230 located on computing device 202. Functional category 210 may describe a field of functionality that application 230 performs. Identification module 104 may identify an additional functional category 211 assigned to computing device 202 and/or another application 232 located on computing device 202. Application module 106 may apply a security policy 214 to both functional category 210 assigned to application 230 and additional functional category 211 to determine whether application 230 belongs on computing device 202 according to security policy 214. Performance module 108 may perform a security action 216 to protect users based on the application of security policy 214 to functional category 210 assigned to application 230 and additional functional category 211.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. Notably, any permutation of modules 102 may be located client-side on computing device 202, server side on server 206, shared between these two, for example.

Server 206 generally represents any type or form of computing device that is capable of creating, maintaining, and/or applying security policies based on functional categories. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
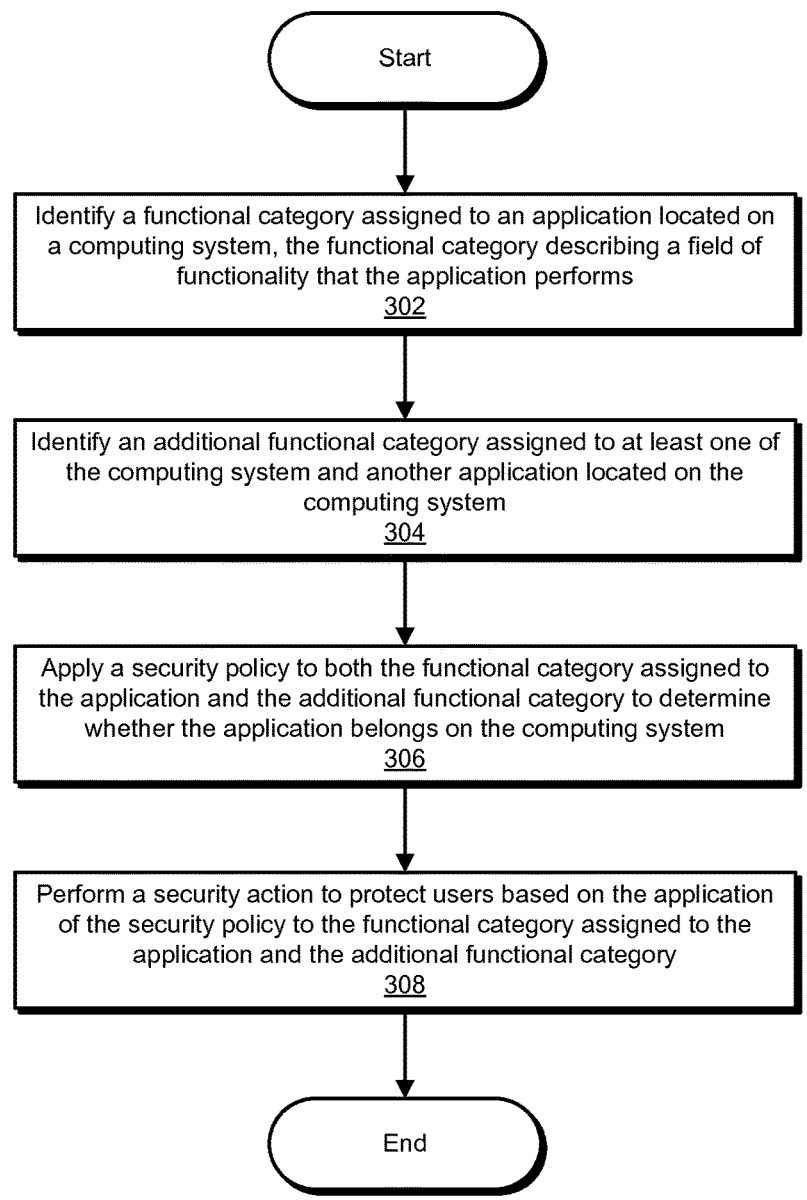
FIG. 3 is a flow diagram of an exemplary method for detecting misplaced applications using functional categories.

FIG. 3 is a flow diagram of an exemplary computer-implemented method 300 for detecting misplaced applications using functional categories. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a functional category assigned to an application located on a computing system. The functional category may describe a field of functionality that the application performs. For example, at step 302 identification module 104 may, as part of server 206 in FIG. 2, identify functional category 210 assigned to application 230 located on computing device 202.

As used herein, the term "application" generally refers to executable code or software, including one or more executable files, for example, that a computing system may execute to perform useful functions for a user. Similarly, as used herein, the term "functional category" generally refers to a category that specifies a field of functionality that an application performs. Examples of functional categories include database functionality, web server functionality, print server functionality, administrator functionality, etc. In some examples, functional categories may exist in a parent-child, species-genus, and/or hierarchical relationship with other functional categories. Moreover, as used herein, the phrase "located on the computing system" generally refers to any application stored and/or installed on a computing system (or a peripheral of the computing system). In some examples, applications may be stored or installed on a computing system even if some application files, data, and/or settings are located remotely over a computer network, such as network 204.

Identification module 104 may identify the functional category in a variety of ways. In general, identification module 104 may assign the functional category to the application or may instead identify a functional category that another module or computing system assigned to the application. For example, identification module 104 may identify the functional category after the same or different computing system (e.g., the same or different from computing device 202) assigns the functional category to the application. The same or different computing system may assign the functional category in part by analyzing evidence that indicates functionality performed by the application. In general, identification module 104 and/or the same or different computing system may assign the functional category based on any evidence that tends to indicate functionality performed by the application. In one embodiment, the evidence may include (1) an ACTIVE DIRECTORY classification, (2) data accessed by the application, (3) data output by the application, and/or (4) metadata for the application. For example, identification module 104 may translate and/or copy an ACTIVE DIRECTORY, or other network classification, to a functional category for the performance of method 300. Identification module 104 may similarly analyze incoming and/or outgoing network packets and/or file system requests, inspect these to detect an associated field of functionality, and assign the functional category based on the detected field of functionality. Identification module 104 may similarly, or additionally, identify the functional category based on a functional category associated with users who use the application.

More generally, identification module 104 and/or the same or different computing system may monitor the application's behavior to detect functionality performed by the application. For example, identification module 104 may monitor activity and/or values at each of the following: (1) file system locations, (2) network ports, (3) memory pages, (4) registers, (5) system registry, and/or (6) network destinations targeted by the application. Identification module 104 and/or the same or different computing system may previously associate any of these locations with one or more fields of functionality. Identification module 104 and/or the same or different computing system may assign a corresponding functional category (or increase a relationship between the application and the functional category) based on the detected activity and association.

In one embodiment, identification module 104 and/or the same or different computing system may analyze previously categorized applications, using machine learning, to assign the functional category to the application by predicting that the application performs functionality that corresponds to the functional category. For example, identification module 104 and/or the same or different computing system may determine, through machine learning, that the same or different application, or applications that exhibit the same or similar behavior (e.g., the same or different input, output, installation locations, file system and/or network requests, etc.) previously were assigned a specific functional category. Identification module 104 may then assign the same or similar functional category to the application.

In some examples, identification module 104 may identify the functional category assigned to the application by receiving, or identifying previously-received, manual input by a user indicating a tag (e.g., alphanumeric identifier, name, and/or symbol) assigned to the application. For example, a user may identify a tag that indicates a field of functionality that the application performs. The user may similarly use any suitable method, peripheral, and/or interface for inputting and assigning a functional category.

In further examples, identification module 104 may identify the application as a clean application. For example, identification module 104 may identify the application as whitelisted on a whitelist. In further examples, identification module 104 may determine one or more identifiers for the application (e.g., a hash, file name, metadata, etc.) and search a whitelist and/or blacklist for the identifiers. Identification module 104 may also determine that the application has an unknown status (e.g., is not known as malware). In response, identification module 104 may then tentatively assume that the application is clean or safe. Similarly, identification module 104 may condition performance of all or part of method 300 on the identification of the application as clean and/or on the identification of the application as unknown. In other words, if identification module 104 has already identified the application as malware (e.g., malware in any context or in most contexts), then there is no further reason to determine whether the application is misplaced on computing device 202.

In some embodiments, identification module 104 may detect when applications are newly stored and/or installed on the computing system (e.g., by scanning at a predefined schedule or interval or by intercepting/monitoring file system or operating system requests). Identification module 104 may perform further actions, including any of the actions discussed above for step 302 (e.g., identifying the functional category or categories for the application and initiating method 300) in response to detecting the new presence or arrival of the application on the computing system.

Returning to FIG. 3, at step 304 one or more of the systems described herein may identify an additional functional category assigned to the computing system and/or another application located on the computing system. For example, at step 304 identification module 104 may, as part of server 206 in FIG. 2, identify additional functional category 211 assigned to computing device 202 and/or application 232 located on computing device 202.

In general, the definitions and guidance above for the "application" and the "functional category" of step 302 may similarly apply, in parallel, to the other application and the "additional functional category" of step 304. For example, Identification module 104 may identify the additional functional category using any of the techniques described above for step 302 of method 300. These techniques may include: translating and/or copying previous classifications, monitoring behavior of the computing system (e.g., computing device 202) and/or the other application, monitoring file system and/or network activity by the computing system and/or the other application, and/or receiving manual input.

In some examples, identification module 104 may identify the additional functional category by iteratively identifying additional functional categories for respective applications located on the computing system. In general, identification module 104 may identify any number of additional applications on the computing system. For example, identification module 104 may identify a predefined set of applications and/or a set of applications that satisfy one or more criteria. The criteria may include criteria relating to the location (e.g., file system location), functionality, installation time, last read time, last write time, last/first execution time, permissions, and/or users for the application. For example, identification module 104 may identify functional categories for each application located at the computing system that was installed and/or saved within a certain location and/or within a certain frame of time. In some examples, identification module 104 may identify the additional functional category by scanning the computing system for all applications located on the computing system and/or by identifying all applications detected during a security software scan.

Returning to FIG. 3, at step 306 one or more of the systems described herein may apply a security policy to both the functional category assigned to the application and the additional functional category to determine whether the application belongs on the computing system according to the security policy. For example, at step 306 application module 106 may, as part of server 206 in FIG. 2, apply security policy 214 to both functional category 210 assigned to application 230 and additional functional category 211 to determine whether application 230 belongs on computing device 202 according to security policy 214.

As used herein, the term "security policy" generally refers to any policy within a computerized security system that specifies or suggests actions, outcomes, settings, etc., for the protection of users. Security policies may instruct the computerized security system to perform certain actions in response to detecting a security threat or vulnerability, as defined by the security policies. For example, the systems and methods herein may generally apply security policies by using the functional category and the additional functional category, as described above, as inputs into a formula, heuristic, and/or plan defined by the security policies, which may specify one or more security measures as outputs.

Figure 4:
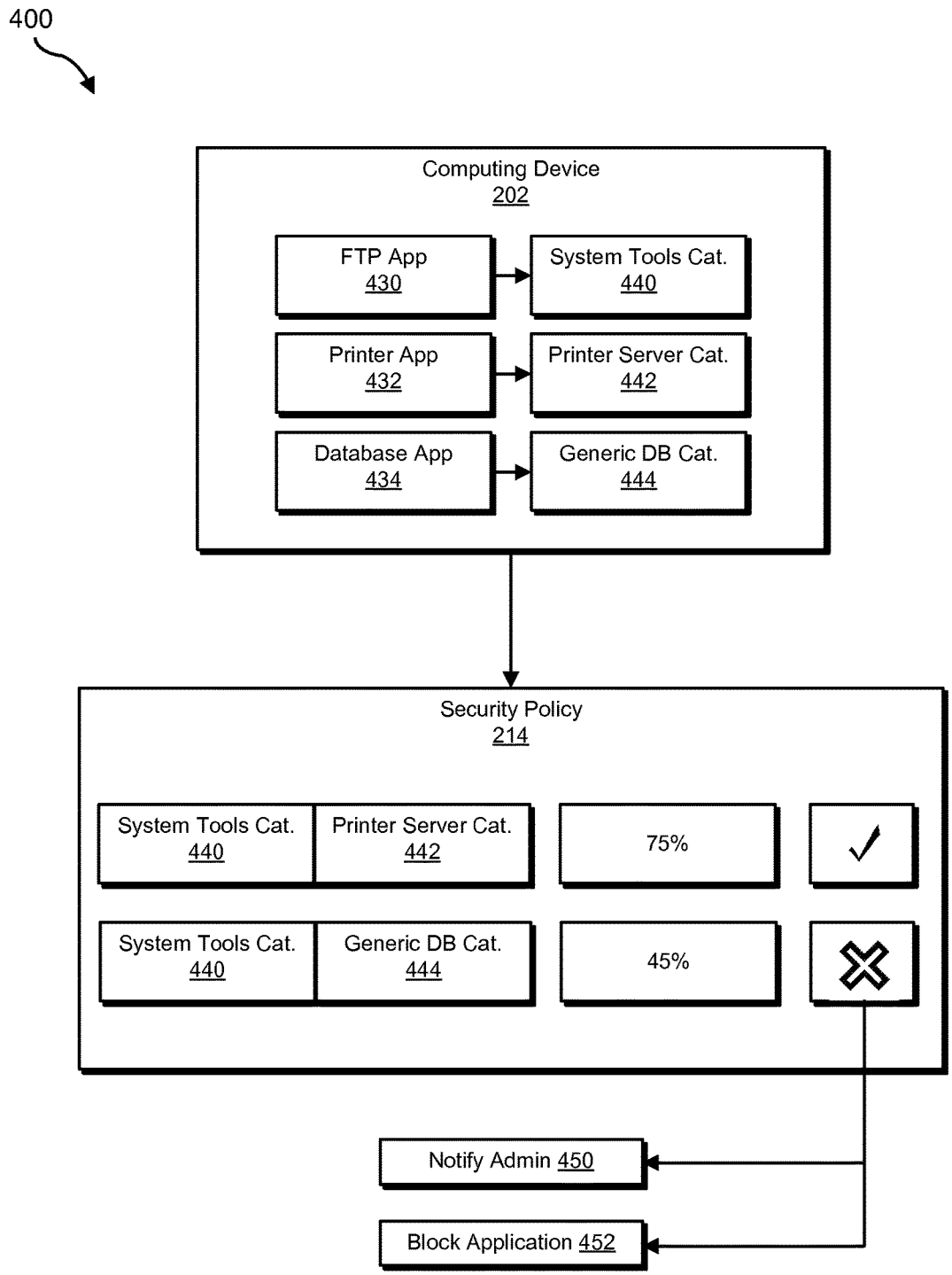
FIG. 4 is a block diagram of an exemplary security policy that specifies security actions to take based on detected functional categories of applications.

Application module 106 may apply the security policy to the functional category and the additional functional category in a variety of ways. FIG. 4 shows an exemplary illustration of security policy 214. As further shown in FIG. 4, the disclosed systems and methods may use security policy 214 to protect users at computing device 202, for example. As also shown in FIG. 4, computing device 202 may include an FTP application 430, a printer application 432, and a database application 434, any one or more of which may correspond to the application (as discussed for step 302) and the other application (as discussed for step 304). FIG. 4 also shows that identification module 104 has identified corresponding functional categories for these applications: a system tools category 440, a printer server category 442, and a generic database category 444.

In one embodiment, the security policy may specify (1) whether the functional category and the additional functional category are authorized as a pair and/or (2) whether a degree of relatedness between the functional category and the additional functional category satisfies a security threshold. For example, FIG. 4 shows that security policy 214 includes both pairs of categories formed from the three categories listed within computing device 202: (1) a pair formed of system tools category 440 and printer server category 442 and (2) a pair formed of system tools category 440 and generic database category 444. Application module 106 may store and/or analyze these pairs in an order-independent manner or order-dependent manner, as discussed further below.

As further shown in FIG. 4, security policy 214 may specify that the first pair (system tools category 440 and printer server category 442) may have a degree of relatedness of 75%. Similarly, security policy 214 may specify that these two categories are permitted as a pair, on the same computing system, as graphically depicted by the check mark in FIG. 4. In contrast, the second pair (system tools category 440 and generic database category 444) may only have an estimated degree of relatedness of 45%. That degree of relatedness may not satisfy a security threshold, such as 50%. For the same reasons, security policy 214 may specify that the categories of the second pair are not permitted as a pair on the same computing system (or other single context/environment), as graphically depicted by the "X" mark in FIG. 4.

The example of FIG. 4 is merely exemplary and for illustration purposes. Instead of pairs, or in addition to pairs, the security policy may specify groups of categories of any arbitrary size, including triplets and beyond (and specify degrees of relatedness and/or approval/disapproval for the same, as in FIG. 4). As discussed above, application module 106 may analyze groups of categories in an order-dependent and/or order-independent manner (e.g., may specify a different policy, security action, and/or outcome for the same pair of categories depending on the order in which the categories are encountered and/or stored in memory). Moreover, application module 106 may apply the security policy to instances of categories, such that multiple instances of the same category may be input to the security policy if the category appears multiple times for different applications. Alternatively, application module 106 may apply the security policy to the categories without considering how many applications correspond to the same respective category.

Similarly, although FIG. 4 shows a degree of relatedness using percentages, application module 106 may use any arbitrary symbol, number, and/or scale to represent the degree of relatedness. Moreover, although security policy 214 analyzes or considers every permutation of pairs produced by the three categories listed in computing device 202, as shown in FIG. 4, this is not necessary. In other embodiments, application module 106 may apply the security policy to less than all identified categories, or instances of categories, found on a computing system, network node, or other context/environment (e.g., within one or more constraints, such as time and location constraints, as discussed above). Similarly, although FIG. 4 focuses on functional categories for applications, the security policy may additionally or alternatively specify policies for a functional category of the computing system or context where the applications are located.

In some examples, application module 106 may apply the security policy in part by building a degree of expectedness for the functional category based on other functional categories at the computing system. In the example of FIG. 4, application module 106 may determine whether system tools category 440 is expected at computing device 202 by considering first how the existence of printer server category 442 and/or generic database category 444 adjusts an expectedness value for system tools category 440. Application module 106 may base the expectedness value on the prevalence of applications having system tools category 440 among computing systems where printer server category 442 and/or generic database category 444 are also located, in a data set of known safe configurations. For example, if, among known safe configurations, system tools category 440 is rarely present (e.g., below a prevalence threshold) among computing systems that also have present printer server category 442 and/or generic database category 444, then application module 106 may construct and/or adjust the expectedness value to be low, failing (e.g., a binary value), and/or below a security threshold. In general, after constructing and/or adjusting the expectedness value, application module 106 may then determine whether the value meets a security threshold (e.g., and performance module 108 may only perform a reactive security action in response to determining that the threshold is not satisfied, indicating a security threat).

Similarly, application module 106 may apply the security policy in part by identifying a cluster or super-category at the computing system (e.g., for the computing system) where the application is located. For example, the application categories "database-ORACLE" and "database-SAP" may both belong to the super-category "database" in a parent-child or hierarchical relationship. Application module 106 may apply the security policy to functional category 210 at least in part by applying a security policy for the super-category and/or cluster to functional category 210. For example, a security policy for the super-category "database" may specify that photo editing software is not permitted on the same computing system with that cluster.

Application module 106 may similarly modulate the application of the security policy for the super-category in proportion to a degree to which the computing system and/or other applications at the computing system match the super-category or cluster. For example, a computing system that strongly matches the "database" super-category (e.g., all applications on the computing system are database applications) may strongly apply the security policy for the "database" super-category. More specifically, application module 106 may modulate an adjustment made to a security score based on the security policy for the super-category in proportion to an extent to which the context or computing system matches or resembles the super-category. For example, if eight applications are associated with a cluster, but only seven are present at the computing system, then ⅞ of a default or preset value may be applied as the adjustment based on the cluster security policy.

In some examples, application module 106 may apply the security policy to the functional category of the application by considering (or factoring in) the combination of functional categories of other identified applications at the computing system. For example, the security policy may specify decreasing a security score for the application based on its functional category not matching the functional category of another present application. Nevertheless, the security policy may also specify increasing the security score for the application based on its functional category matching or resembling the functional category for a third application (or for any other number of additional applications). The increasing of the security score may thereby offset or compensate for the other decrease. The security policy may similarly adjust the security policy up and/or down for any number of pairs (or triplets, or beyond) of functional categories. After considering all of these adjustments, application module 106 may then determine whether the finally adjusted value satisfies a security threshold. Additionally, or alternatively, the security policy may specify that certain pairs (or triplets, or beyond) of functional categories can never coexist, regardless of the presence of other functional categories. Similarly, the security policy may also specify that certain security scores are so low that they automatically fail a security test, even if the presence of other functional categories might otherwise raise the security score back toward a security threshold.

Figure 5:
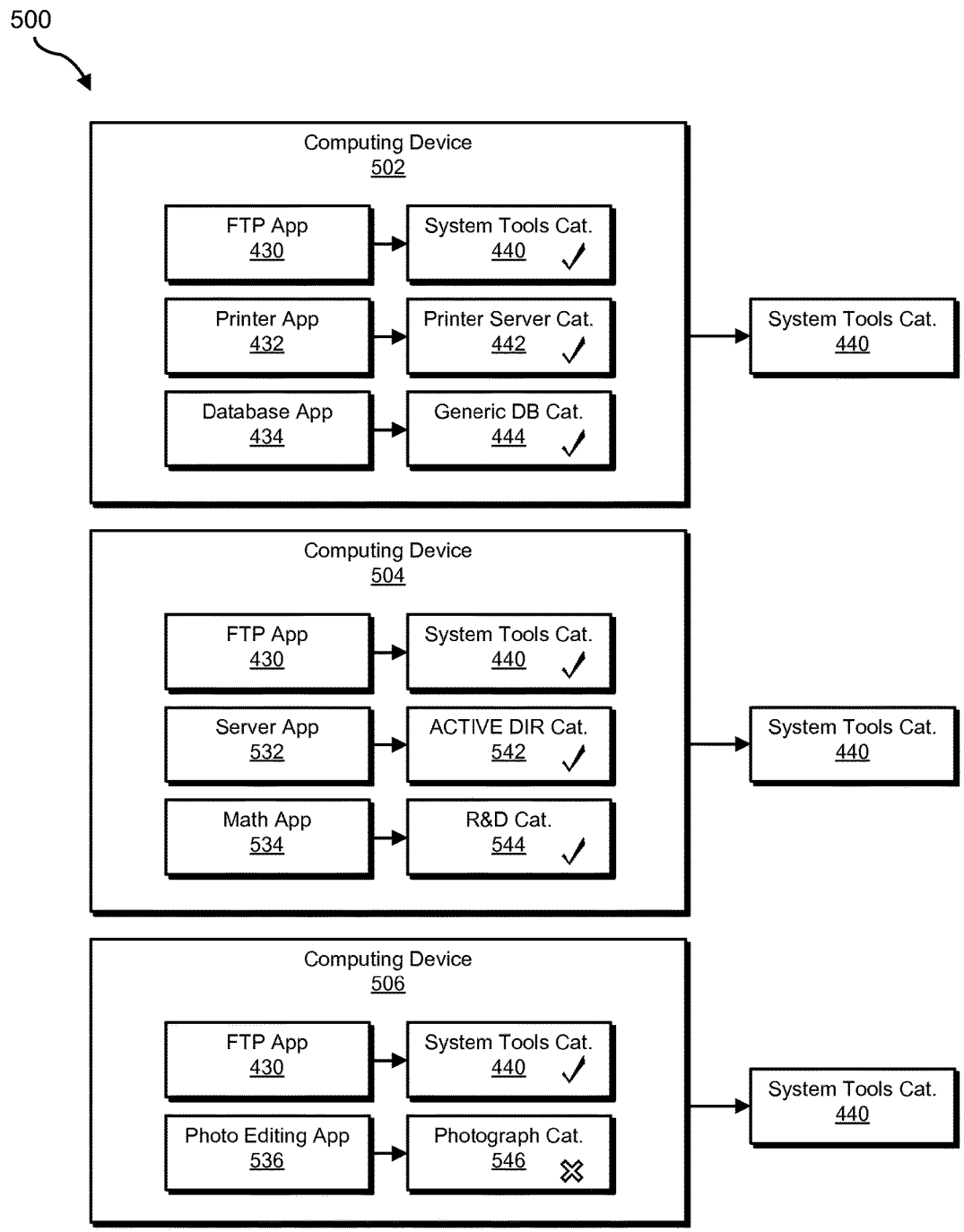
FIG. 5 is a block diagram of exemplary contexts that form a data set for machine learning to generate security policies.

FIG. 5 illustrates how, in another embodiment, application module 106 may generate the security policy through machine learning. Specifically, application module 106 and/or the same or different computing system may generate the security policy, through machine learning, by analyzing other applications that, for each of the respective applications, was previously detected as (1) authorized in a context where the respective application was located or (2) not authorized in the context where the respective application was located. As shown in FIG. 5, a computing system 502, a computing system 504, and a computing system 506 may each represent different contexts where applications may be found. Moreover, as further shown in FIG. 5, each context may specify (1) functional categories of other applications where the respective application was located, and/or (2) a functional category of the computing system where the respective application was located. In other words, in the example of FIG. 5, each of the computing systems and/or the applications located at each computing system may be assigned a respective functional category. New applications (those not shown in FIG. 4) may include a server application 532, a math application 534, and a photo editing application 536, which may be assigned the following functional categories: ACTIVE DIRECTORY category 542, research and development category 544, and photograph category 546. Similarly, each of the computing systems may be assigned system tools category 440, as shown in the boxes on the right of FIG. 5.

The three computing systems shown in FIG. 5 may represent a data set, as discussed above, through which application module 106 may perform machine learning. Application module 106 may similarly analyze any arbitrary number of recorded contexts that specify functional categories and/or applications located at those contexts. Moreover, for each of the computing systems (e.g., contexts), the data set may specify whether the functional category of the application is permitted or authorized in that context.

In the example of FIG. 5, application module 106 and/or the same or different computing system may detect patterns from the data set to construct the security policy. For example, application module 106 may detect that (A) systems tool category 440, assigned to FTP application 430, is present for at least one application in 100% of the computing systems shown in FIG. 5, (2) similarly 100% of the computing systems are assigned the same system tools category 440, and (3) similarly 100% of the applications having the system tools category 440 are authorized to be there (as indicated by the check marks shown in FIG. 5). Application module 106 may then infer that (A) applications having system tools category 440 are permitted on computing systems having system tools category 440 and/or (B) that applications, more generally, having a specific functional category are permitted on computing systems having the same functional category. In contrast, application module 106 and/or the same or different computing system may similarly detect, through machine learning, a pattern such that (1) photograph category 546 is not present on any other computing system having the system tools category 440 (other than computing system 506) and (2) photograph category 546 is not authorized (as indicated by the "X" mark shown in FIG. 5). Application module 106 may then infer that applications having photograph category 546 are not permitted on computing systems having system tools category 440.

In both of the above examples of machine learning, and in general, application module 106 may assign a corresponding weight or strength to the inferred rule, heuristic, and/or hypothesis, based on the strength to which the underlying data set supports the rule (e.g., is consistent with the rule). These are relatively simple patterns to detect and heuristics to generate. Machine learning algorithms, including supervised learning (e.g., statistical classification), unsupervised learning (artificial neural networks, association rule learning, hierarchical clustering, cluster analysis, and/or outlier detection), reinforcement learning, and/or deep learning may identify far more complex and sophisticated patterns, including patterns that are difficult or impractical to articulate through ordinary English language. Application module 106 and/or the same or different computing system may generate or adjust the security policy based on detected anomalies (or incongruities) according to these patterns. Application module 106 may similarly factor in the degree to which any particular configuration is considered anomalous (e.g., not supported by the machine learning data set). More generally, application module 106 may perform machine learning to identify pairs, triplets, groups, and/or clusters where the presence of functional categories tend to predict the presence of other members of the same. Similarly, application module 106 may perform machine learning to identify pairs, triplets, groups, and/or clusters where the presence of functional categories tend to predict the absence of other members of the same. Application module 106 may then apply these insights to identify that a particular new application is misplaced at a computing system.

At step 308 one or more of the systems described herein may perform a security action to protect users based on the application of the security policy to the functional category assigned to the application and the additional functional category. For example, at step 308 performance module 108 may, as part of server 206 in FIG. 2, perform security action 216 to protect users based on the application of security policy 214 to functional category 210 assigned to application 230 and additional functional category 211.

As used herein, the term "security action" generally refers to any action that a computerized security system may take to protect a user. Examples of security actions may include notifying a user and/or administrator, requesting approval from a user and/or administrator (e.g., to allow an application to run and/or install), blocking an application, uninstalling an application, sandboxing an application, monitoring an application, and/or altering or adjusting security settings, etc.

Performance module 108 may perform the security action in a variety of ways. The security action may include notifying an administrator, as shown by step 450 in FIG. 4. Similarly, the security action may include blocking the application in one or more ways (e.g., blocking installation, storage in memory, reading/writing to the application, and/or execution), as shown by step 452 in FIG. 4. In some examples, performance module 108 may seek confirmation from a user or administrator before the application is allowed to be (or blocked from being) saved, installed, executed, accessed, modified, and/or updated. The security action may also include more general responses not specific to the application such as locking the operating system, shutting down the operating system, shutting down the computer, and/or blocking a network connection or port. Similarly, the security action may also include informing the user or administrator about details of the security policy, identified functional categories for applications and/or computing systems, and/or how the security policy applies to the functional categories. In some examples, users may manually edit and/or modify the security policy as well.

As explained above, the disclosed systems and methods may protect users from misplaced applications, even when those applications are whitelisted or categorized as safe in a generic, global, and/or unknown context. For example, the disclosed systems and methods may protect users from applications that an administrator accidentally misplaces in a context where the application does not belong. The disclosed systems and methods may similarly protect users from applications that an attacker intentionally places in a context where the application does not belong and where the application may be used in a coordinated attack.

Figure 6:
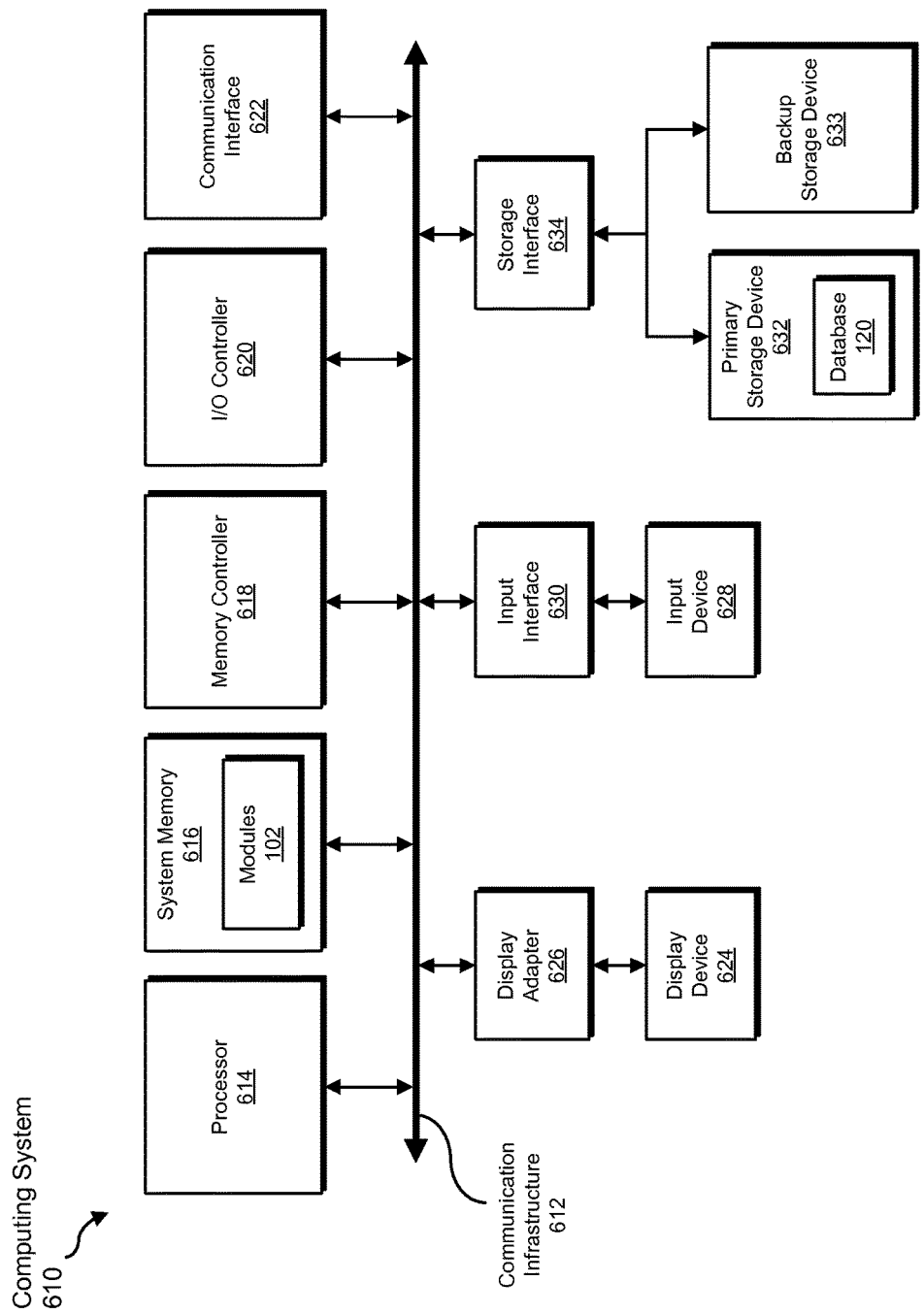
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
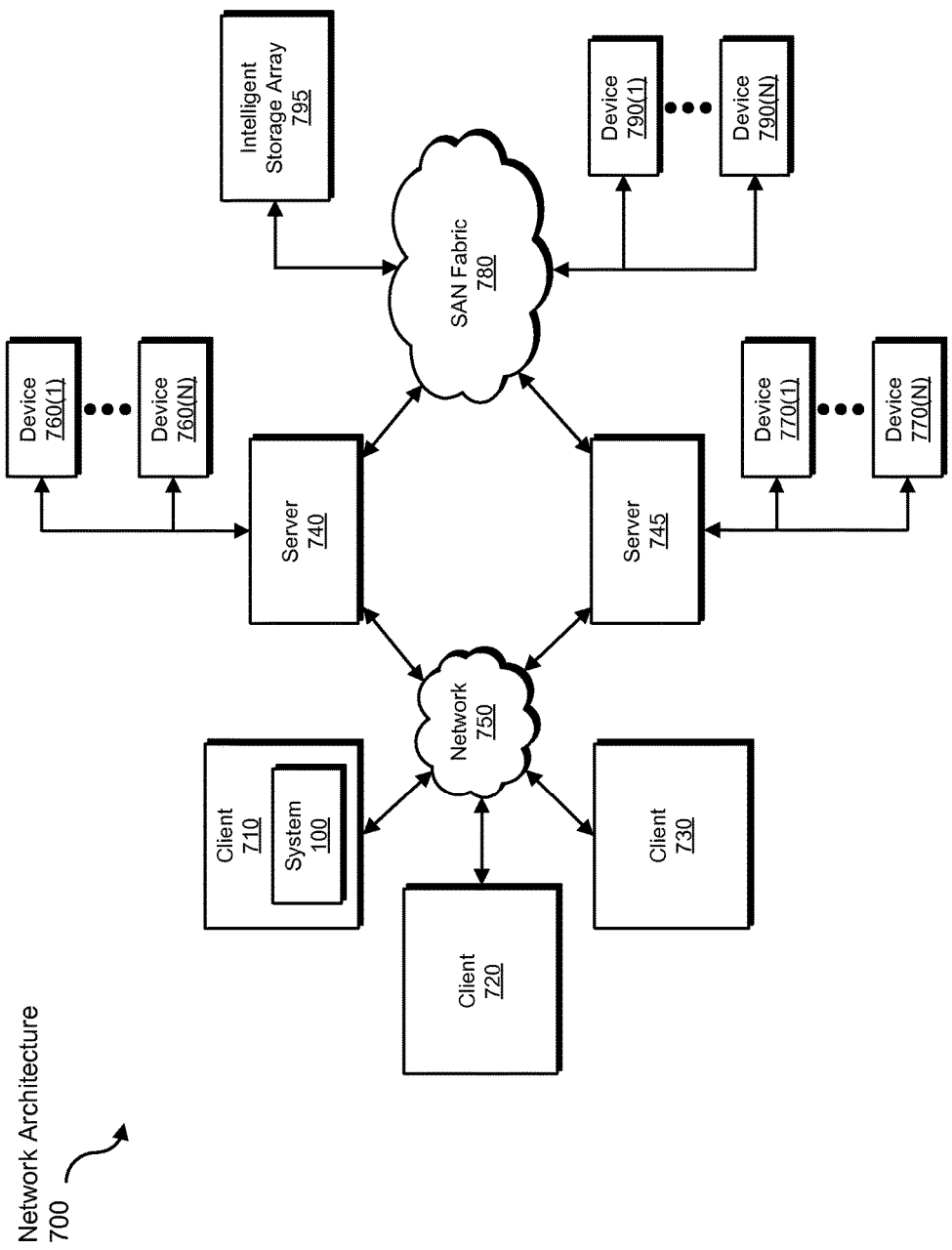
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting misplaced applications using functional categories.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive security policies, applications, and/or functional category identifiers to be transformed, transform any permutation of these or transform a computing system or computerized security system, output a result of the transformation to a display or memory, use the result of the transformation to protect users from misplaced applications and associated security threats, and store the result of the transformation to a disk or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting misplaced applications using functional categories, at least a portion of the method being performed by a computing device comprising at least one processor, the method comprising:

identifying a functional category assigned to an application located on a computing system in response to at least one of installation of the application and a scheduled scan that detects the application, the functional category describing a field of functionality that the application performs;

identifying an additional functional category assigned to another application located on the computing system;

applying a security policy to both the functional category assigned to the application and the additional functional category assigned to the other application located on the computing system and determining, based on applying the security policy, whether the application belongs on the computing system according to the security policy, wherein the security policy specifies at least one of:

whether the functional category and the additional functional category are authorized as a pair; and whether a degree of relatedness between the functional category and the additional functional category satisfies a security threshold;

identifying the application as performing functionality that does not match functionality of the other application on the computing system according to the security policy; and performing, in response to identifying the application as performing functionality that does not match the functionality of the other application on the computing system according to the security policy, a security action to protect users by notifying an administrator about the application located on the computing system.

2. The method of claim 1, wherein the same or a different computing system assigns the functional category to the application at least in part by analyzing evidence that indicates functionality performed by the application.

3. The method of claim 2, wherein the evidence includes at least one of:
an ACTIVE DIRECTORY classification;
data accessed by the application;
data output by the application; and
metadata for the application.

4. The method of claim 2, wherein the same or the different computing system analyzes previously categorized applications, using machine learning, to assign the functional category to the application by predicting that the application performs functionality that corresponds to the functional category.

5. The method of claim 1, wherein identifying the functional category assigned to the application comprises receiving manual input by a user indicating a tag assigned to the application.

6. The method of claim 1, wherein the functional category assigned to the application comprises at least one of:
a system tools category;
a printer server category; and
a generic database category.

7. The method of claim 1, wherein identifying the additional functional category comprises iteratively identifying a plurality of additional functional categories for a plurality of respective applications located on the computing system.

8. The method of claim 7, wherein identifying the additional functional category comprises scanning the computing system for all applications located on the computing system.

9. The method of claim 1, wherein the same or a different computing system generates the security policy, through machine learning, by analyzing other applications that, for each of the other applications, was previously detected as one of:
authorized in a context where the application was located; and
not authorized in the context where the application was located.

10. The method of claim 1, further comprising identifying the application as blacklisted on a blacklist.

11. The method of claim 1, wherein applying the security policy further comprises applying the security policy to the functional category of the application and at least two additional functional categories of at least two other applications.

12. A system for detecting misplaced applications using functional categories, the system comprising:
an identification module, stored in a memory, that:
identifies a functional category assigned to an application located on a computing system in response to at least one of installation of the application and a scheduled scan that detects the application, the functional category describing a field of functionality that the application performs; and
identifies an additional functional category assigned to another application located on the computing system;
an application module, stored in the memory, that applies a security policy to both the functional category assigned to the application and the additional functional category assigned to the other application located on the computing system and determines, based on applying the security policy, whether the application belongs on the computing system according to the security policy, wherein the security policy specifies at east one of:

whether the functional category and the additional functional category are authorized as a pair; and
whether a degree of relatedness between the functional category and the additional functional category satisfies a security threshold;
wherein the identification module further identifies the application as performing functionality that does not match functionality of the other application on the computing system according to the security policy;
a performance module, stored in the memory, that performs, in response to identifying the application as performing functionality that does not match the functionality of the other application on the computing system according to the security policy, a security action to protect users by notifying an administrator about the application located on the computing system; and
at least one-hardware processor configured to execute the identification module, the application module, and the performance module.

13. The system of claim 12, wherein the same or a different computing system assigns the functional category to the application at least in part by analyzing evidence that indicates functionality performed by the application.

14. The system of claim 13, wherein the evidence includes at least one of:
an ACTIVE DIRECTORY classification;
data accessed by the application;
data output by the application; and
metadata for the application.

15. The system of claim 13, wherein the same or the different computing system analyzes previously categorized applications, using machine learning, to assign the functional category to the application by predicting that the application performs functionality that corresponds to the functional category.

16. The system of claim 12, wherein the identification module identifies the functional category assigned to the application by receiving manual input by a user indicating a tag assigned to the application.

17. The system of claim 12, wherein the functional category assigned to the application comprises at least one of:
a system tools category;
a printer server category; and
a generic database category.

18. The system of claim 12, wherein the identification module identifies the additional functional category by iteratively identifying a plurality of additional functional categories for a plurality of respective applications located on the computing system.

19. The system of claim 18, wherein the identification module identifies the additional functional category by scanning the computing system for all applications located on the computing system.

20. A non-transitory computer-readable medium comprising one or more computer-readable instructions that, when executed by at least one processor of a computing device, cause the computing device to:
identify a functional category assigned to an application located on a computing system in response to at least one of installation of the application and a scheduled scan that detects the application, the functional category describing a field of functionality that the application performs;
identify an additional functional category assigned to another application located on the computing system;

apply a security policy to both the functional category assigned to the application and the additional functional category assigned to the other application located on the computing system and determine, based on applying the security policy, whether the application belongs on the computing system according to the security policy, wherein the security policy specifies at least one of:

whether the functional category and the additional functional category are authorized as a pair; and whether a degree of relatedness between the functional category and the additional functional category satisfies a security threshold;

identify the application as performing functionality that does not match functionality of the other application on the computing, system according to the security policy; and perform, in response to identifying the application as performing functionality that does not match the functionality of the other application on the same computing system according, to the security policy, a security action to protect users by notifying an administrator about the application located on the computing system.

* * * * *